United States Patent
Sun et al.

(10) Patent No.: US 7,289,834 B2
(45) Date of Patent: Oct. 30, 2007

(54) ANTENNA SIGNAL PROCESSING SYSTEMS

(75) Inventors: Yong Sun, Bristol (GB); Hidehiro Matsuoka, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 809 days.

(21) Appl. No.: 10/384,602

(22) Filed: Mar. 11, 2003

(65) Prior Publication Data
US 2004/0001554 A1 Jan. 1, 2004

(30) Foreign Application Priority Data
Mar. 14, 2002 (GB) .................... 0206026.7

(51) Int. Cl.
*H04M 1/00* (2006.01)
(52) U.S. Cl. .............. 455/575.5; 455/25; 455/137; 455/550.1; 455/561; 455/562.1; 455/575.5; 455/575.7
(58) Field of Classification Search ........... 455/25, 455/137, 550.1, 561, 562.1, 575.7, 575.5
See application file for complete search history.

(56) References Cited

U.S. PATENT DOCUMENTS

| 5,982,327 A | 11/1999 | Vook et al. |
| 6,087,986 A | 7/2000 | Shoki et al. |
| 6,249,250 B1 | 6/2001 | Namekata et al. |
| 7,110,733 B1 * | 9/2006 | Aoyama .................... 455/137 |
| 7,117,016 B2 * | 10/2006 | Kisigami et al. ........ 455/562.1 |

FOREIGN PATENT DOCUMENTS

| EP | 0 602 615 | 6/1994 |
| EP | 1 043 801 | 10/2000 |
| EP | 1 182 728 | 2/2002 |
| GB | 2 169 452 | 7/1986 |
| GB | 2 344 221 | 5/2000 |

* cited by examiner

*Primary Examiner*—Quynh H. Nguyen
(74) *Attorney, Agent, or Firm*—Oblon, Spivak, McClelland, Maier & Neustadt, P.C.

(57) ABSTRACT

Antenna techniques particularly for orthogonal frequency division multiplexed (OFDM) communications systems. A signal processing system determines weights for an adaptive antenna, the antenna including plural antenna elements each receiving a signal including plural subcarriers. The system includes plural inputs for receiving signals from the antenna elements, a time-to-frequency domain transformer for each input for transforming the signal from each input to a plurality of subcarrier signals, a first weight determiner coupled to the inputs, before the time-to-frequency domain transformer in the signal path, and configured to determine a first set of weights, one for each input, and a second weight determiner coupled to the first weight determiner and configured to determine, from the determination of the first set of weights, at least one second set of weights including a frequency-domain weight for a subcarrier signal derived from each of the inputs.

44 Claims, 9 Drawing Sheets

ANTENNA SIGNAL PROCESSING SYSTEMS

FIELD OF THE INVENTION

This invention relates to improved antenna techniques, particularly for Orthogonal Frequency Division Multiplexed (OFDM) communication systems.

BACKGROUND OF THE INVENTION

Orthogonal frequency division multiplexing is a well-known technique for transmitting high bit rate digital data signals. Rather than modulate a single carrier with the high speed data, the data is divided into a number of lower data rate channels each of which is transmitted on a separate subcarrier. In this way the effect of multipath fading is mitigated. In an OFDM signal the separate subcarriers are spaced so that they overlap, as shown for subcarriers 12 in spectrum 10 of FIG. 1a. The subcarrier frequencies are chosen that so that the subcarriers are mutually orthogonal, so that the separate signals modulated onto the subcarriers can be recovered at the receiver. One OFDM symbol is defined by a set of symbols, one modulated onto each subcarrier (and therefore corresponds to a plurality of data bits). The subcarriers are orthogonal if they are spaced apart in frequency by an interval of 1/T, where T is the OFDM symbol period.

An OFDM symbol can be obtained by performing an inverse fourier transform, preferably an Inverse Fast Fourier Transform (IFFT), on a set of input symbols. The input symbols can be recovered by performing a fourier transform, preferably a fast fourier transform (FFT), on the OFDM symbol. The FFT effectively multiplies the OFDM symbol by each subcarrier and integrates over the symbol period T. It can be seen that for a given subcarrier only one subcarrier from the OFDM symbol is extracted by this procedure, as the overlap with the other subcarriers of the OFDM symbol will average to zero over the integration period T.

Often the subcarriers are modulated by QAM (Quadrature Amplitude Modulation) symbols, but other forms of modulation such as Phase Shift Keying (PSK) or Pulse Amplitude Modulation (PAM) can also be used. To reduce the effects of multipath OFDM symbols are normally extended by a guard period at the start of each symbol. Provided that the relatively delay of two multipath components is smaller than this guard time interval there is no inter-symbol interference (ISI), at least to a first approximation.

FIG. 1b shows an exemplary OFDM transmitter 100 (here in a mobile terminal, MT) and an exemplary OFDM receiver 150 (here in an access point, AP). In the transmitter 100 a source 102 provides data to a baseband mapping unit 104, which optionally provides forward error correction coding and interleaving, and which outputs modulated symbols such as QAM symbols. The modulated symbols are provided to a multiplexer 108 which combines them with pilot symbols from a pilot symbol generator 106, which provides reference amplitudes and phases for frequency synchronisation and coherent detection in the receiver (in other arrangements differential detection may be employed). The combination of blocks 110 converts the serial data stream from multiplexer 108 to a plurality of parallel, reduced data rate streams, performs an IFFT on these data streams to provide an OFDM symbol, and then converts the multiple subcarriers of this OFDM symbol to a single serial data stream. This serial (digital) data stream is then converted to an analogue time-domain signal by digital-to-analogue converter 112, up-converted by up-converter 114, and after filtering and amplification (not shown) output from an antenna 116. Antenna 116 may comprise an omni-directional antenna, a sectorised antenna or an array antenna with beamforming.

The signal from antenna 116 of transmitter 100 is received by an antenna 152 of receiver 150 via a "channel" 118. Typically the signal arrives at antenna 152 as a plurality of multipath components, with a plurality of different amplitudes and phases, which have propagated via a plurality of different channels or paths. These multipath components combine at the receiver and interfere with one another to provide an overall channel characteristic typically having a number of deep nulls, rather like a comb, which generally change with time (particularly where the transmitter or receiver is moving). Often there will be a number of transmitters in the same general location, for example an office, and this gives rise to co-channel interference, which can be more problematic than multipath.

The antenna 152 of receiver 150 is coupled to a down-converter 154 and to an analogue-to-digital converter 156. Blocks 158 then perform a serial-to-parallel conversion, FFT, and parallel-to-serial re-conversion, providing an output to demultiplexer 160, which separates the pilot symbol signal 162 from the data symbols. The data symbols then demodulated and de-mapped by base-band de-mapping unit 164 to provide a detected data output 166. Broadly speaking the receiver 150 is a mirror image of the transmitter 100. The transmitter and receiver may be combined to form an OFDM transceiver.

OFDM techniques may be employed in a variety of applications and are used, for example, for military communication systems and high definition tv. Here, applications of the invention will be discussed with particular reference to the HIPERLAN (High Performance Radio Local Area Network) Type 2 standard (www.etsi.org/technicalactiv/hiperlan2.htm, and DTS/BRAN-0023003 v 0.k). Although applications of the invention are not limited to this environment HIPERLAN 2 wireless local area network communications are managed by a common node, the access point.

The receiver of FIG. 1b is somewhat simplified as, in practice, there is a need to synchronise the FFT window to each OFDM symbol in turn, to avoid introducing non-orthogonality and hence Inter-Carrier Interference (ICI). This may be done by auto-correlating an OFDM symbol with the cyclic extension of the symbol in the guard period but it is generally preferable, particularly for packet data transmission, to use known OFDM (training) symbols which the receiver can accurately identify and locate, for example using a matched filter. It will be appreciated that this matched filter operates in the time domain, that is before the FFT is carried out (as opposed to the post-FFT frequency domain). In a packet data system data packets may be provided with a preamble including one or more of these training symbols.

FIGS. 2a and 2b show, respectively, a receiver front end 200 and receiver signal processing blocks 250 of a HIPERLAN 2 mobile terminal (MT) OFDM receiver. The receiver 250 shows some details of the analogue-to-digital conversion circuitry 252, the synchronisation, channel estimation and control circuitry 254 and the de-packetising, de-interleaving and error correcting circuitry 256.

The front end 200 comprises a receive antenna 202 coupled to an input amplifier 204 and a mixer 206, which has a second input from an IF oscillator 208 to mix the RF signal to IF. The IF signal is then provided to an automatic Automatic Gain Control (AGC) amplifier 212 via a band pass filter 210, the AGC stage being controlled by a line 226 from control circuitry 254, to optimise later signal quantisation. The output of AGC 212 provides an input to two mixers 214, 216, which are also provided with quadrature signals from an oscillator 220 and splitter 218 to generate quadrature I and Q signals 222, 224. These I and Q signals are then over-sampled, filtered and decimated by analogue-to-digital circuitry 254. The over-sampling of the signal aids the digital filtering, after which the signal is rate reduced to the desired sample rate.

It is desirable (but not absolutely essential) to compensate for the effects of the transmission channel. This can be done using a known symbol, for example in preamble data or one or more pilot signals. In the receiver 250 of FIG. 2 a known preamble symbol, referred to as the "C symbol", is used to determine a channel estimate. The receiver synchronises to the received signal and switch 258 is operated to pass the received C symbol to channel estimator 260. This estimates the effect of the channel (rotation of the symbols in the sub-carriers) on the known C symbol so that the effects of the channel can be compensated for, by multiplying by the complex conjugate of the channel response. Alternatively the one or more pilot signals (which also contain known symbols) can be used to determine a channel estimate. Again the phase rotation and amplitude change required to transform the received pilot into the expected symbol can be determined and applied to other received symbols. Where more than one pilot is available at more than one frequency improved channel compensation estimates can be obtained by interpolation/extrapolation to other frequencies using the different frequency pilot signals.

In FIG. 2 the receiver front end 200 will generally be implemented in hardware whilst the receiver processing section 250 will often be implemented in "software", as illustrated schematically by Flash RAM 262 using, for example, ASICs, FPGAs or one or more DSP (digital signal processor) chips. A similar division between hardware and software will generally be present in the transmitter. However the skilled person will recognise that all the functions of the receiver of FIG. 2 (or of an equivalent transmitter) could be performed in hardware. Similarly the exact point at which the signal is digitised in a software radio will generally depend upon a cost/complexity/power consumption trade-off, as well as upon the availability of suitable high speed analogue/digital converters and processors, and that the RF signal could be digitised at IF or a higher frequency.

FIG. 3 shows an example of a Media Access Control (MAC) frame 300 of a packet data communications system including preamble sequences. The MAC frame includes a broadcast channel (BCH) burst 302, a frame channel (FCH) burst 304, an access feedback channel (ACH) burst 306, a down-link (DL) burst 308, an up-link (UL) burst 310, a direct link (DiL) burst 312, and a random access (RCH) burst 314, all of which contain a preamble sequence.

FIGS. 4a to e show, respectively, a broadcast burst, downlink burst, an uplink burst with a short preamble, uplink burst with a long preamble, and a direct link burst of a HIPERLAN 2 physical layer signal. Each of these bursts comprises a preamble portion 400 and a data payload portion 402. The preamble portions 400 comprise one or more of three basic OFDM symbols, denoted A, B and C. The values of these symbols are known and A and B (and, if desired, C) can be recovered in the time domain (pre-FFT). These symbols are generally used to establish the frame and frequency synchronisation and to set the FFT window for the data following the symbols; they may also be employed to control AGC stage 212. In the receiver of FIGS. 2 A and B are recovered in the time domain and C is recovered in the frequency domain, that is post-FFT.

FIG. 5 illustrates, schematically, the use of these (known) preamble symbols for frame detection 502 based on RSSI (Received Signal Strength Indication), automatic gain control 504, frame synchronisation 506, and frequency synchronisation 508; a schematic illustration of the preamble portion of an MAC frame 500 is also illustrated for comparison.

FIG. 6 shows a plot 600 in the frequency and time domain illustrating the relative positions of preamble sequences 602, pilot signals 604, and data signals 606 for HIPERLAN 2, which has 48 data sub-carriers and 4 pilots (and one unused, central carrier channel 608). As can be seen from FIG. 6 the first four OFDM symbols comprise preamble data, and the pilot signals 604 continue to carry their preamble symbols. However on the remaining (data-bearing) sub-carriers OFDM symbols 5 onwards carry data. In other OFDM schemes similar plots can be drawn, although the preamble and pilot positions may vary (for example, the pilots need not necessarily comprise continuous signals).

It has previously been mentioned that OFDM is a useful technique for alleviating the effects of frequency selective fading caused by multipaths. However with particularly high data rates or in particularly severe multipath environments OFDM communications systems can still suffer from the effects of multipath fading. Moreover in indoor wireless environments, such as small office wireless LANs, there will often be a number of similar systems operating simultaneously in the same frequency band, because of limited spectrum availability. This can result in severe co-channel interference.

One technique which has been proposed for combatting such multipath and co-channel interference is the use of a sectorised transmit and/or receive antenna. The region to be covered is divided into a number of sectors, typically 3, 4 or 6, and one antenna (or more where diversity is employed) is provided for each sector, the patterns of the antennas being arranged to each cover mainly just one sector. In effect the main beam of each of the sector antennas points in a different direction and by selecting the transmit and/or receive direction the effects of multipath components and/or co-channel interference arriving from unwanted directions can be reduced. HIPERLAN 2, for example, supports the use of up to seven sectors at the Access Point. Some of the benefits of employing a sectorised switching array antenna in a HIPERLAN 2 environment are described in "Performance of HIPERLAN 2 using Sectorised Antennas" A. Dufexi, S. Armour, A. Nix, P. Karlsson and D. Bull, IEE Electronics Letters Feb. 15, 2001, volume 37 no. 4, page 245.

Another approach employed to mitigate the effects of multipath and co-channel interference uses a beamforming antenna array, such as a linear array of antenna elements in which the inter-antenna spacing is approximately one half a (carrier) wavelength. Signals from the antennas are combined, with appropriate phase and amplitude weightings, to provide a combined response with one or more lobes or beams. An array comprising n elements can be arranged to provide up to n−1 beams.

There are a number of different beamforming algorithms which may be applied to such an adaptive antenna array and details of these will be well known to the skilled person. One commonly used algorithm is the Constant Modulus Algorithm (CMA), described in J. R. Treichler and B. G. Agee, "A New Approach to Multipath Correction of Constant Modulus Signals", IEEE Trans. Acoust. Speech and Signal Process., vol. ASSP-31, no. 2, page 459, 1983, which is hereby incorporated by reference. Broadly speaking this algorithm iteratively determines the weights for combining the signals from the antenna elements based upon a cost function chosen to make the spectrum of the combined signals approximately flat. The phase angles of the weights are chosen so that the beams point in the direction of maximum signal power, or, alternatively, so that nulls are formed in the directions of the unwanted multipath components or co-channel interference.

Determining appropriate weights for the antenna array elements is relatively straightforward in a narrow band system but in an OFDM receiver, where the bandwidth occupied by the group of sub-carriers is normally >1 MHz and in many cases >10 MHz, a single set of weights is unlikely to be optimal across the entire bandwidth and may only be valid, for example, at the centre of the frequency band. This can be understood, for example, from the consideration that the antenna element spacing, in terms of fractions of a sub-carrier wavelength, varies across the OFDM frequency band. In the receiver of FIG. 1 adaptive array weights may be applied at points 168, 170, or 172 but applying the array weights at positions 168 or 170 (pre-FFT) will not normally result in a good set of estimated weights across the frequency band.

One solution to this problem is therefore to apply weightings after the FFT, at point 172, where different sets of weights can be applied to each sub-carrier. FIG. 7 shows an OFDM receiver 700 in which a separate set of weights is applied to each sub-carrier in this way. However it will be appreciated that with K sub-carriers and L antenna elements a total of K×L weights must be determined, which is a lengthy and processor-intensive task adding considerably to the receiver complexity. EP 0 852 407 describes an arrangement in which an operational band is partitioned into four equal sub-bands, one set of weights being calculated for each sub-band rather than for each sub-carrier, to reduce the number of weights to be calculated. However this is still a relatively complicated procedure and, moreover, produces a sub-optimal result. An alternative approach is described in Fujimoto et al, "A Novel Adaptive Array Utilising Frequency Characteristics", IEICE Trans. Commun., vol. E 83-B, no. 2 Feb. 2000, page 371, which is hereby incorporated by reference, in which the post-FFT separated sub-carriers are used to determine a single set of pre-FFT time domain weights using CMA. This approach provides a considerable simplification of the weight determining procedure but, again, the weights are sub-optimal.

U.S. Pat. No. 6,249,250 describes OFDM adaptive antenna weight determination techniques for use in either the time or frequency domain (but not both simultaneously). Other weight-determination techniques involving sub-carrier clustering are described in Japanese patent application number 2000-391221 filed on 22 Dec. 2000, inventor Hidehiro Matsuoka, and British patent application number 0108026.6 filed on 30 Mar. 2001 entitled "Adaptive Antenna".

The above-described weight calculation techniques for array antennas each have pros and cons, some providing relatively accurate weight determination at the expense of complex and time-consuming processing, others having simpler, faster weight determination algorithms but in general providing poorer weight estimates. There is therefore a need for improved array antennas and weight determination techniques which can provide good weight estimates without imposing an excessive signal processing burden.

SUMMARY OF THE INVENTION

According to the present invention there is therefore provided a signal processing system for determining weights for an adaptive antenna, the antenna having a plurality of antenna elements each for receiving a signal comprising a plurality of subcarriers, the system comprising, a plurality of inputs for receiving signals from said plurality of antenna elements, a time-to-frequency domain transformer for each input for transforming the signal from each input to a plurality of subcarrier signals, a first weight determiner coupled to said inputs, before the time-to-frequency domain transformer in the signal path, and configured to determine a first set of weights, one for each input, and a second weight determiner coupled to said first weight determiner and configured to determine, from the determination of said first set of weights, at least one second set of weights comprising a frequency-domain weight for a subcarrier signal derived from each of said inputs.

The signal processing system greatly simplifies the calculation of weights for each subcarrier (or for a subcarrier group) in the frequency domain as compared with prior art techniques. This in turn allows the power consumption and/or cost of providing an adaptive antenna with digital beamforming in the frequency domain to be significantly reduced. The system is also flexible enough to allow additional adaptive signal processing methods to be applied in the frequency domain to further improve system performance where necessary.

In one embodiment the time domain or pre-FFT processing to determine the first set of weights has the effect of defining a direction, for example a direction with the highest signal-to-interference ratio for the band. One or more directions may alternatively be determined by identifying those directions which are above a threshold of received power level. This direction or directions, or more generally a spatial property or beam pattern defined by the first set of weights, is preferably substantially maintained when calculating the second set of weights. The algorithm used to determine the second set or sets of weights aims to maintain the beam direction or pattern and, in a simple embodiment, comprises a small number of multiply operations, for example one for each array antenna element. Thus the second sets of weights are chosen so that the antenna beam for each subcarrier has the same direction as that determined when calculating the first set of weights. The values of the sets of weights will be different because the subcarriers are at different frequencies.

The first weight determiner effectively functions as a direction of arrival (DoA) detector, the output of which is used by the second weight determiner. Thus in the invention the function of the first weight determiner may be performed by any form of direction of arrival detector.

Various measures may be used to determine the initial beam direction (or directions), such as a simple measure of received power, but preferably the system uses the first weight determiner to determine a direction (or directions) based upon signal-to-interference ratio. This helps discriminate against co-channel interference, which can have a relatively large received power level. The first weight determiner may determine a set of weights which aims to null out multipath and/or co-channel interference, that is an antenna response pattern best characterised as having one or more nulls rather than one or more main lobes. However this embodiment is less preferable as, particularly in a wide-band system, there may be a large number of multipath components to attenuate whereas generally speaking, only one or a few lobes will serve to pick out the signals with the best signal-to-interference ratios. The first set of weights may be determined conventionally by minimising a cost function which increases as the signal-to-interference ratio goes down.

The signal processing system may be applied at an Access Point or base station or at the mobile end, for example in a Mobile Terminal. The system may be implemented in hardware, for example in silicon, or in software, or in a combination of the two. Preferably the subcarriers are substantially mutually orthogonal, although the system may also be employed where the subcarriers do not overlap and thus do not need to be orthogonal. However, the system is particularly suited to processing OFDM (Orthogonal Frequency Division Multiplexed) signals.

The second weight determiner preferably calculates the second sets of weights from the first set of weights, but in embodiments it may instead use the results from an intermediate calculation, and in this case it may not be necessary to complete the calculation to determine a usable first set of weights. One second set of weights is preferably provided for each subcarrier signal (a set of weights comprising a weight for each version of a subcarrier, one version derived from the signal from each of the antenna elements) but, where a still further simplified calculation is required, groups of subcarriers may share sets of weights. Thus the subcarriers may be arranged in a number of groups each of which has one of the second sets of weights. Each of the weights in a second set of weights will generally, however, have been derived from the received signals from all the array antenna elements. Preferably the second sets of weights are modified by a channel estimate determined from the signal from each of the antenna elements.

In embodiments all the signals for each subcarrier are combined after weighting by one of the weights from the second sets of weights. Thus, for example, weighted versions of the first carrier derived from each of the antenna elements are combined to provide a combined first subcarrier output, and the remaining subcarriers are likewise combined. Where one or a group of subcarriers has a quality which is significantly inferior to that of the other subcarriers, for example a significantly worse signal-to-interference ratio, a post-FFT narrowband-type beamforming algorithm may be used separately on the one (or the group of) subcarriers. Techniques for this are further described in the related case, "Adaptive Antenna", British patent application number 0108026.6, filed by the present applicant on 30 Mar. 2001, the contents of which are hereby incorporated by reference.

Preferably the first weight determiner implements a direction of arrival detection algorithm which controls a directional response of the antenna, such as a digitial beamforming or beamsteering algorithm. In embodiments where the antenna elements are directional direction of arrival detection may simply comprise selection of one of the elements based upon a power or signal-to-interference ratio threshold.

A preferred embodiment of the invention incorporates a signal and interference detector, which may provide separate signal and interference outputs or a combined output comprising, for example, a signal-to-interference ratio. Preferably the signal and interference detector operates in the time domain, that is before the received signal has been transformed from the time domain to a frequency domain, typically by a fourier transform for an OFDM signal. One signal and interference detector may be provided for each antenna element or a single signal and interference detector may be shared between the elements, for example on a time-multiplexed basis.

Preferably the signal and interference detector determines the strength of the wanted signal and unwanted interference using a correlation technique. A known portion of the received signal may be correlated with a reference signal to determine the wanted signal strength, and with a signal orthogonal to the reference signal to determine the interference strength. The known portion of the received signal may comprise, for example, a preamble sequence such as a pseudo-noise sequence. The correlation is performed in the time-domain—that is the correlation is between two OFDM symbols and hence an inverse fourier transform is performed on the known (preamble or pseudo-noise) data prior to the correlation. Preferably, therefore, the antenna element selector includes a signal generator to generate the reference signal and signal orthogonal to the reference signal, although this is not essential as an appropriate reference may be extracted from the received data.

The signal processing system may incorporate means for angular diversity reception, combining signals with a high signal-to-interference ratio received from different directions. Thus a plurality of post-FFT second sets of weights may be determined for each sub-carrier and for each beam direction and then the corresponding sub-carriers received from each direction may be combined using diversity reception techniques. As previously described the post-FFT subcarrier weights may be derived from the pre-FFT weight determination used for defining the beam directions.

In some cases it may be preferable to divide the incoming OFDM signal into a plurality of sub-bands, each sub-band preferably including a number of subcarriers. Separate pre-FFT weight calculations may then be made for each sub-band, which allows an improved accuracy in post-FFT weight determination, particularly where the receiver response is not flat across the bandwidth of interest. Thus preferably a number of subcarriers are allocated to each of the sub-bands and the post-FFT weights for the sub-carriers within a sub-band use the pre-FFT weights determined for that sub-band. The signal processing system may include means for sub-dividing the OFDM signal bandwidth into sub-bands, for example based upon the OFDM pilot signals.

In a related aspect the invention provides a method of determining weights for an adaptive antenna, the antenna having a plurality of antenna elements each for receiving a signal comprising a plurality of subcarriers, the method comprising, receiving a plurality of signals from said plurality of antenna elements, transforming each of said plurality of received signals into a plurality of subcarrier signals, determining a first set of weights, one for each received signal, and determining, using the determination of said first set of weights, at least one second set of weights comprising a frequency-domain weight for a subcarrier signal derived from each of said received signal inputs signals.

The invention also provides a method of adaptive beamforming for an OFDM antenna comprising a plurality of antenna elements, the method comprising, applying a first beamforming algorithm in the time domain to determine at least one antenna beam direction, and calculating a set of weights for application in the frequency domain to versions of at least one subcarrier, each version of the subcarrier being received by a corresponding one of the antenna elements, said set of weights being calculated using said at least one antenna beam direction.

The invention further provides a method of calculating weights for an array antenna for receiving an orthogonal frequency division multiplexed (OFDM) signal comprising a plurality of subcarriers, the method comprising, determining, in a time domain, a direction of arrival of the OFDM signal at the array antenna, calculating at least one set of weights for application to the subcarriers of the OFDM signal in a frequency domain using said direction of arrival.

Here "time domain" is used to refer to a part of the signal path preceding a time-to-frequency or fourier transform and "frequency domain" is used to refer to a part of the signal path following a time-to-frequency or fourier transform of the received OFDM signal.

In a related aspect the invention provides a carrier carrying processor control code to implement the above-described signal processing systems and methods. This processor control code may comprise computer programme code, for example to control a digital signal processor, or other code such as a plurality of register values to set up a general purpose integrated circuit to implement the selector or method. The carrier may comprise a data carrier or storage medium such as a hard or floppy disk, CD- or DVD-ROM, or a programmed memory such as a read-only memory, or an optical or electrical signal carrier. As the skilled person will appreciate the control code may be also be distributed between a plurality of coupled components, for example on a network. The skilled person will further recognise that the invention may be implemented by a combination of dedicated hardware and functions implemented in software.

BRIEF DESCRIPTION OF THE DRAWINGS

These and other aspects of the invention will now be further described, by way of example only, with reference to the accompanying figures in which:

FIGS. 9a and 9b show, respectively, a schematic diagram of a signal and interference detector, and a schematic diagram of a signal generator for the signal and interference detector of FIG. 9a;

DETAILED DESCRIPTION

Figure 1A:
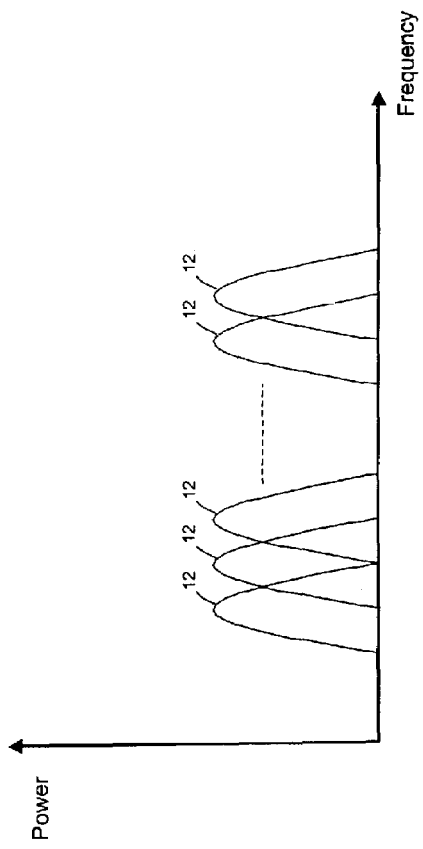
FIGS. 1a and 1b show, respectively, an OFDM symbol and an exemplary OFDM transmitter.
Figure 1B:
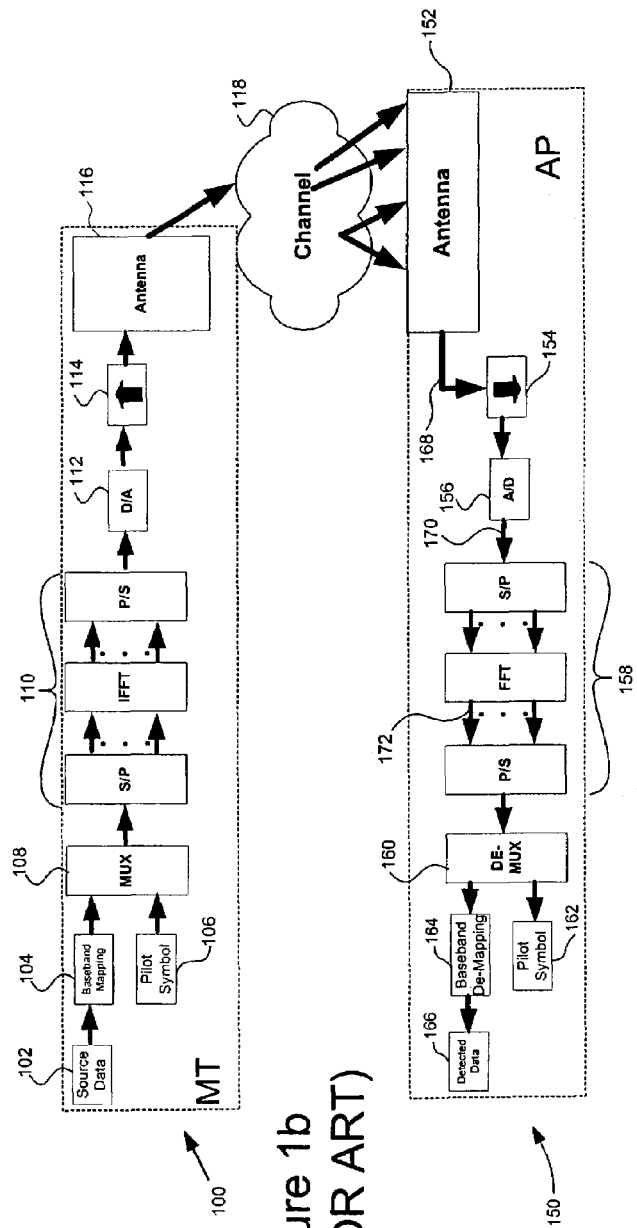
Figure 2A:
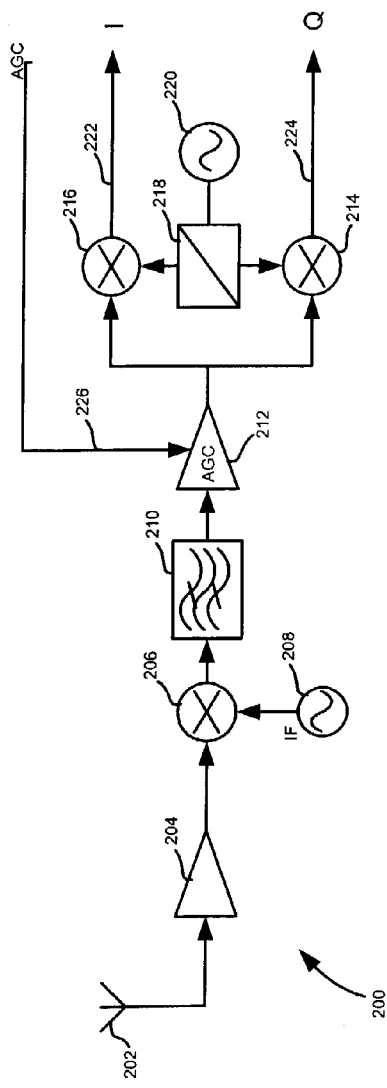
FIGS. 2a and 2b show, respectively, a receiver front end, and signal processing blocks of a HIPERLAN 2 OFDM receiver.
Figure 2B:
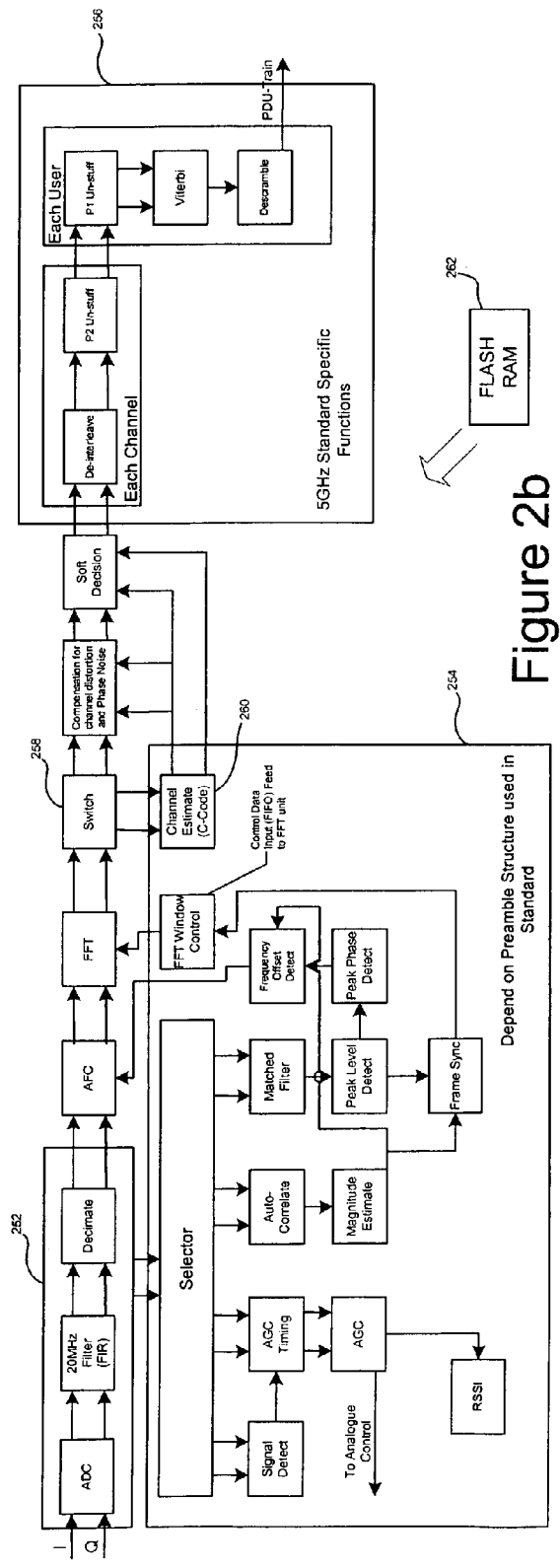
Figure 3:
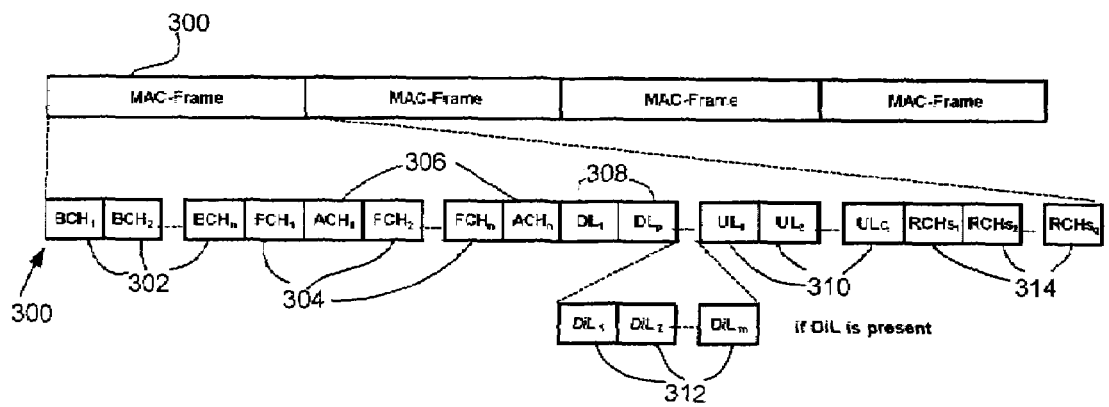
FIG. 3 shows an exemplary Media Access Control frame of a packet data communications system.
Figure 4:
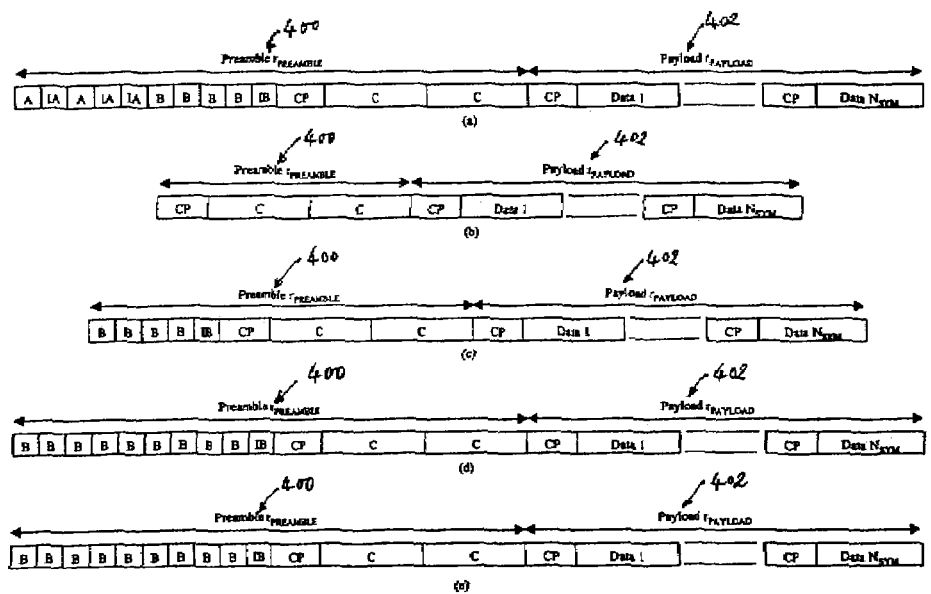
FIGS. 4a to 4e show, respectively, a broadcast burst, a downlink burst, an uplink burst with a short preamble, an uplink burst with a long preamble, and a direct link burst of a HIPERLAN 2 physical layer signal.
Figure 5:
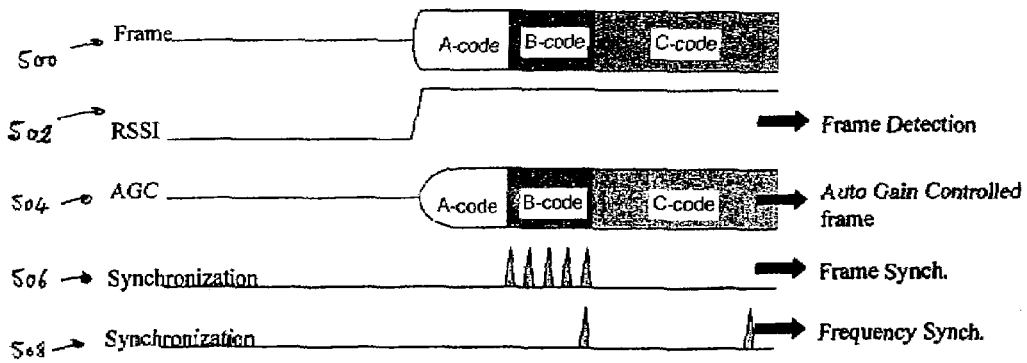
FIG. 5 shows, schematically, uses of the preamble portion of a HIPERLAN 2 broadcast burst in a mobile terminal OFDM receiver.
Figure 6:
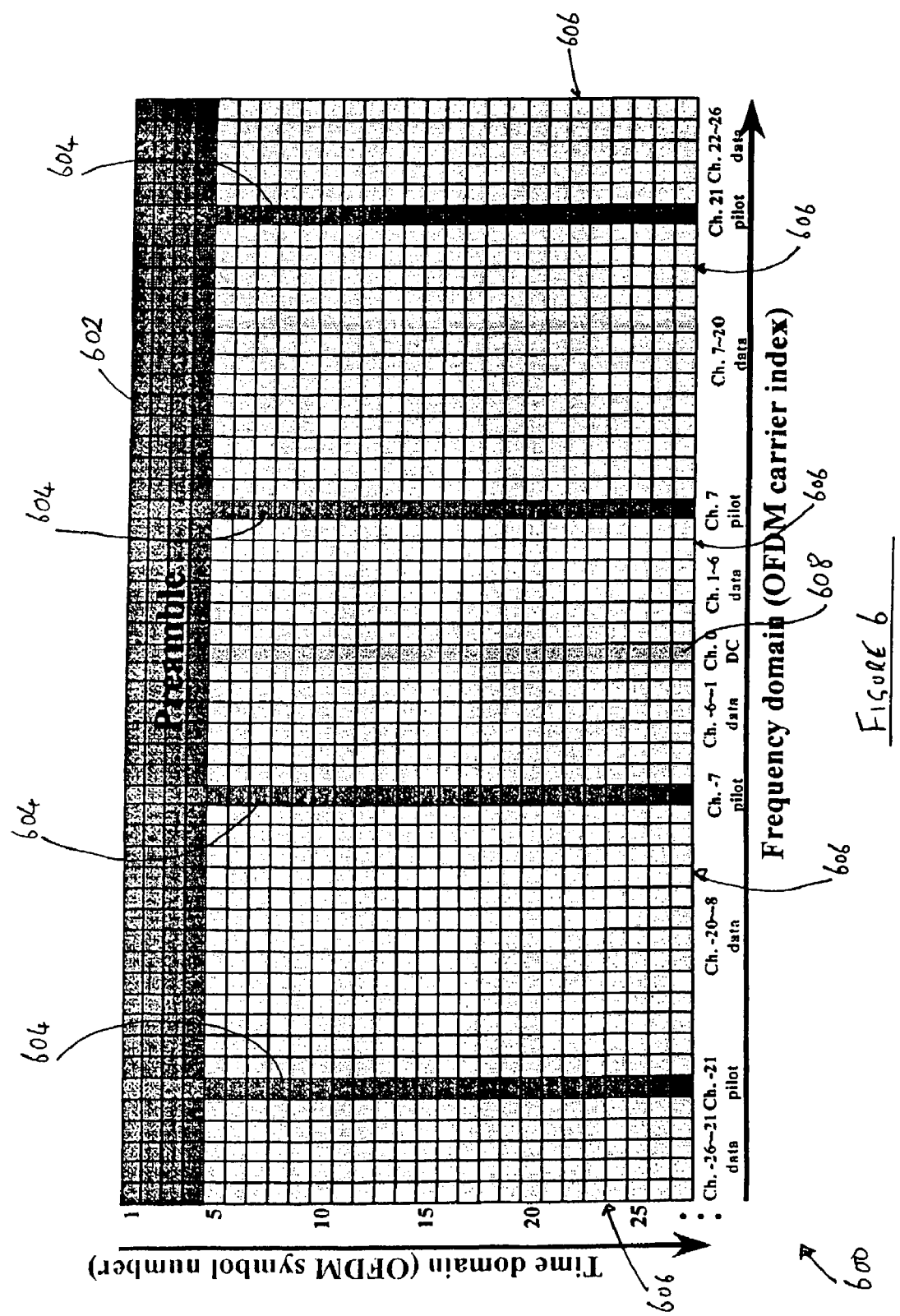
FIG. 6 shows a frequency-time plot of a HIPERLAN 2 OFDM signal including preamble and pilot signals.
Figure 7:
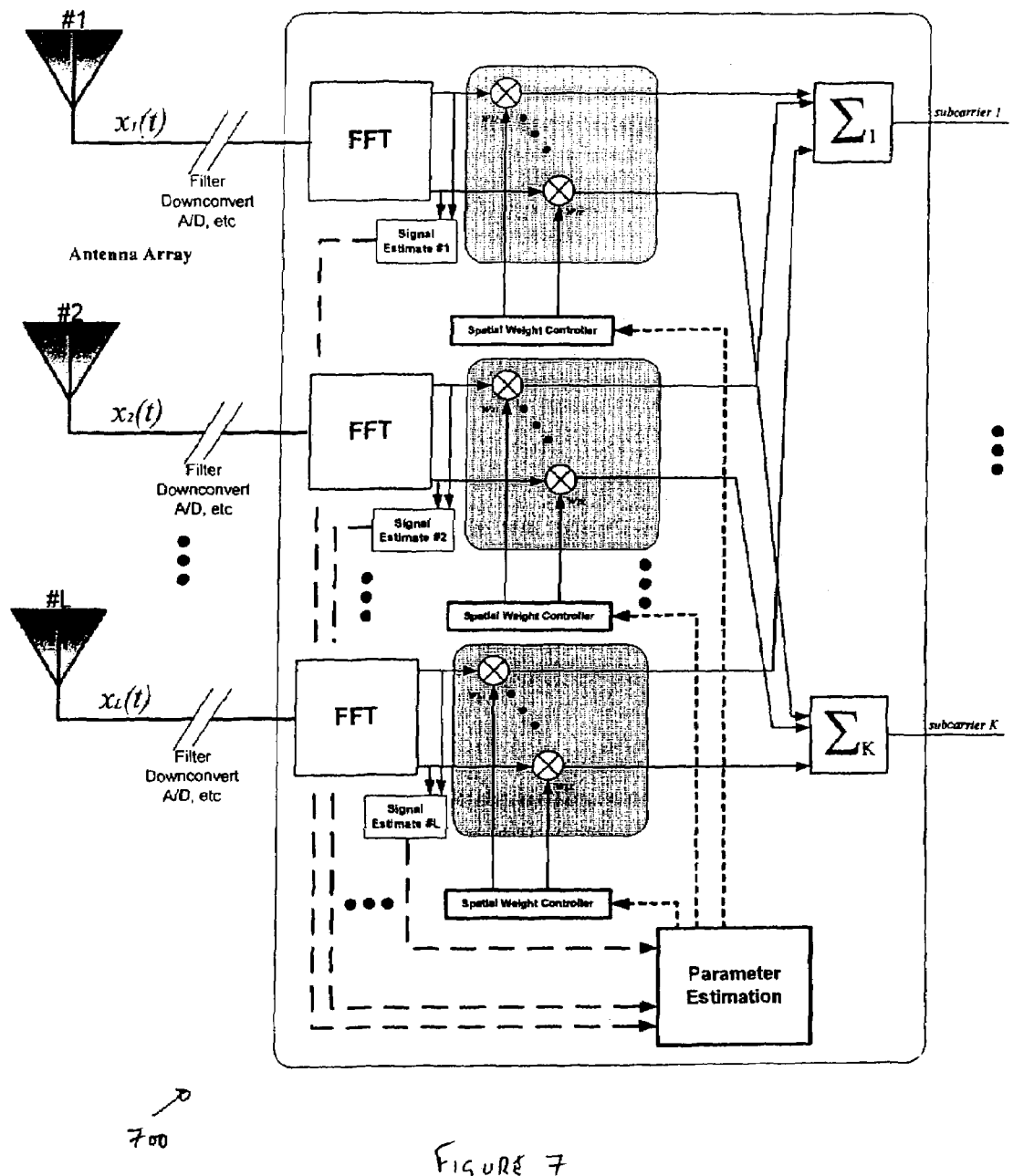
FIG. 7 shows an OFDM receiver in which a separate set of weights is applied to each sub-carrier in the frequency domain.
Figure 8:
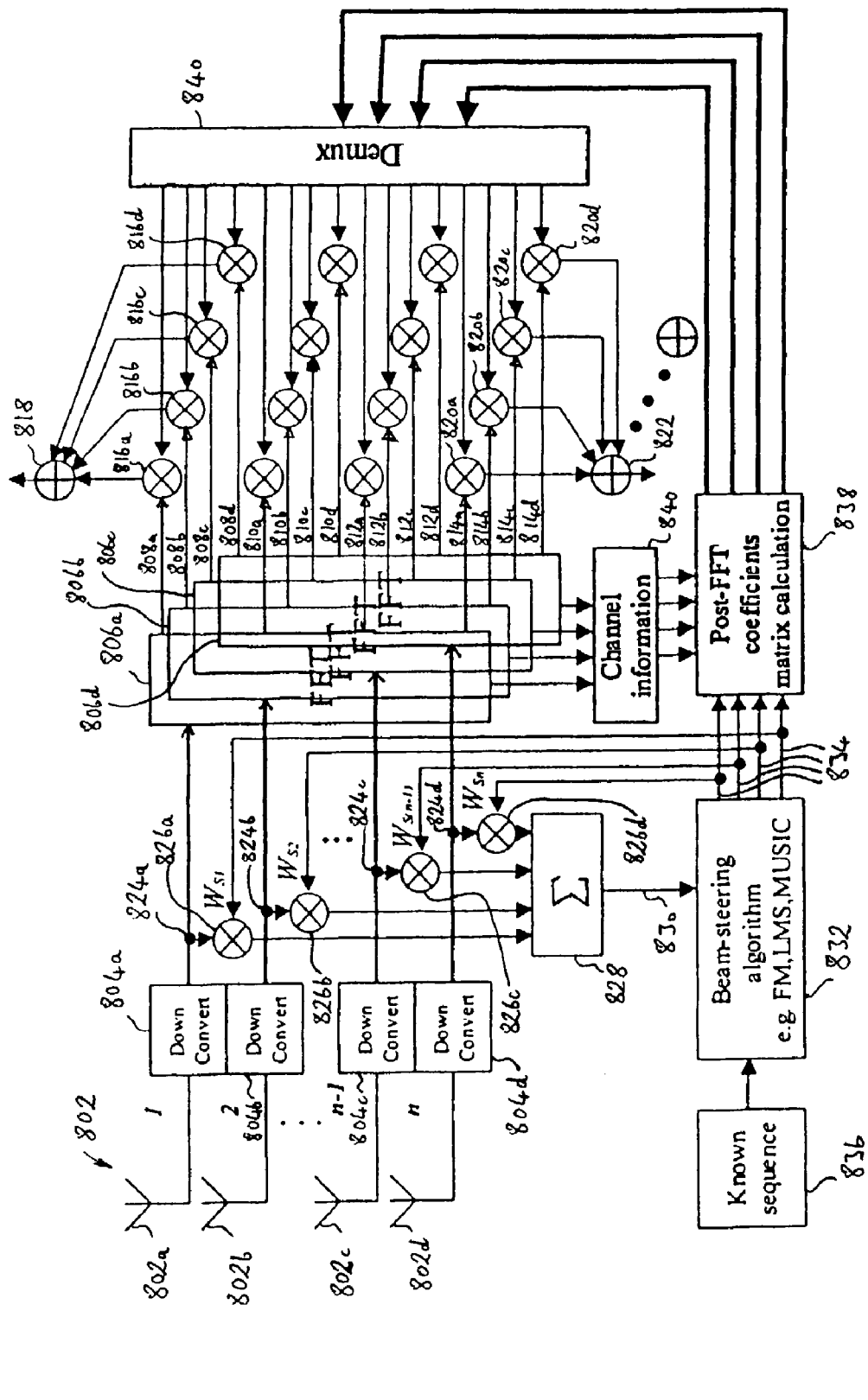
FIG. 8 shows a schematic diagram of an antenna signal processing system according to an embodiment of the present invention.

Referring now to FIG. 8, this shows a schematic diagram of an antenna processing system 800 for calculating weights for an adaptive antenna of an OFDM receiver.

An array antenna 802 comprises n directional antenna elements of which four 802a, b, c, d are shown. To each of the respective antenna elements is coupled a downconverter 804a-d and these downconverters in turn provide received signal inputs for a set of fast fourier transform (FFT) blocks 806a-d. Thus up to this point in the signal processing architecture there is, in effect, a conventional OFDM receiver front end for each antenna element 802. Each FFT block 806 provides a plurality of frequency-domain outputs, one for each subcarrier. For simplicity, in FIG. 8 outputs for only four such subcarriers are shown but, in practice, there are typically more than ten such subcarriers often more than one hundred subcarriers and sometimes more than one thousand subcarriers.

In FIG. 8 lines 808a-d carry frequency domain signals for versions of a first subcarrier derived from received signals from antenna elements 802a-d respectively. Similarly lines 810a-b carry versions of a second subcarrier from respective antenna elements 802a-d, lines 812a-d carry third subcarrier signals from these antenna elements and lines 814a-d carry versions of a fourth subcarrier, one from the signal from each of the antenna elements 802a-d. Each set of each subcarrier has an associated set of multipliers for weighting the subcarrier versions prior to their combination. In the case of the first subcarrier, multipliers 816a-d are provided to multiply the version of the first subcarrier from each antenna element by an appropriate weight prior to summation of these weighted versions of the first subcarrier in summer 818. Likewise multipliers 820a-d are provided for applying weights to the fourth subcarrier on lines 814a-d, the weighted versions of the fourth subcarrier being combined by summer 822. One set of multipliers and one corresponding summer is provided for each set of versions of each subcarrier of the OFDM signal but, for simplicity, only the summers for the first and fourth subcarriers are shown in FIG. 8.

The weights multiplying each version of a subcarrier are generally complex numbers, comprising an amplitude and a phase. The values of the weights are selected to provide an antenna response with one or more beams or lobes pointing towards the direction (or directions) having the greatest received signal power or, preferably, the greatest signal-to-interference ratio.

For an ideal narrow band system with only one signal path and one interference path it is straightforward for an adaptive array antenna processing system to maximise the desired signal by nulling the interference in the spatial domain, employing a single set of weights. However where the relevant frequency band is relatively wide the application of only a single set of coefficients across the whole band results in a spatial response for the antenna which varies across the frequency band. A conventional way to deal with this problem is to treat each subcarrier in an OFDM system individually, as a narrow-band signal, and calculate the weights for multipliers 816 and 820 accordingly. However this approach is complex and processor-intensive.

The applicants have recognised that, in theory, the subcarrier (or subband) weights should be chosen to reproduce the spatial characteristics of the antenna at the frequency of each subcarrier to mitigate the interference. When looked at in this way it can be recognised that calculation of a separate set of weights for each subcarrier or group of subcarriers (i.e.

subband) ab initio is unnecessary as the use of spatial information is repeated, that is, the spatial characterisation at each subcarrier frequency should, ideally, be the same. Thus the signal processing system can be simplified if the weights are calculated in stages, a first stage in which the required spatial response of the antenna is determined, and a second stage in which sets of weights for the versions of each subcarrier (or group of subcarriers) are determined making use of the desired spatial response.

In the arrangement of FIG. 8, as will be described further below, a time-domain process is used to determine an approximate spatial response required for the adaptive antenna, and the set of weights determined by this process is then modified to provide a set of weights appropriate to each subcarrier. This significantly reduces the redundancy present in prior art weight calculation processes.

Referring again to FIG. 8, the signals input to FFT blocks 806a-d are tapped at points 824a-d to provide inputs to a further set of multipliers 826a-d. The outputs from the multipliers are combined by summer 828 and provide an input 830 to a conventional beamsteering algorithm 832. The beamsteering algorithm provides a set of outputs 834 comprising weights for input to multipliers 826a-d, one for each antenna element 802a-d. In this way a conventional beamsteering algorithm is applied to the wideband, time-domain OFDM signals from each antenna elements, prior to the FFT operation.

The time-domain adaptive antenna process aims to spatially separate the desired signal from any interference by controlling the antenna beam pattern. The signal direction of arrival (DoA) information can be determined by employing the same, conventional algorithms and procedures as are used for DoA determination in narrow-band systems. Such methods include the Fourier Method (FM), Least Means Squares (LMS) method, Multiple Signal Classification (MUSIC) method, and the ESPRIT (Estimation of Signal Parameters via Rotational Invariance Techniques) method.

The purpose of algorithm 832 is to detect the direction of arrival of one signal or of a group of signals, in the presence of multipath, and to spatially separate the signal from the interference. The assumption is made that the spatial characterisation of the signal and interference is approximately constant across the applicable frequency band. Making this assumption a matrix of weights or coefficients for each subcarrier (or for a group of subcarriers) can be calculated in a frequency domain to substantially maintain the spatial characteristics of the antenna.

In a preferred embodiment the antenna beamsteering is based upon a determined signal-to-interference ratio rather than an absolute level of received power. Such a signal-to-interference ratio may be calculated by making use of a known transmitted data sequence such as a preamble portion of an OFDM signal, correlating the known and received signals as explained in more detail below. For this reason the signal processing system preferably includes a signal generator 836 to provide a version of the known sequence, as transmitted. The beamsteering algorithm may be chosen to maximise the signal-to-interference ratio (or, alternatively, to minimise the interference-to-signal ratio), as described, for example, in M Fujimoto, N Kikuma and N Inagaki, "Performance of CMA adaptive array optimised by Marquardt method for suppressing multipath waves", IEICE Trans., vol. J74-B-II, no. 11, 1991, page 599 which is hereby incorporated by reference. Since a measurement of signal-to-interference ratio based upon a preamble at the start of an OFDM data frame is not a continuous measurement, the assumption is made that the channels for the desired signal and interference (that is amplitude and phase) are quasi-static.

Figure 9A:
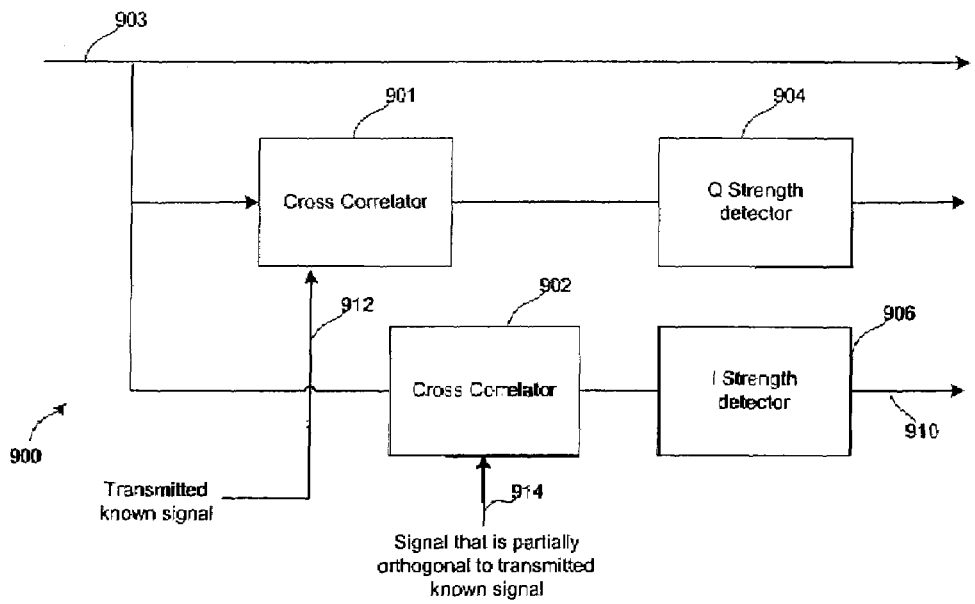

Referring now to FIG. 9a, this illustrates an exemplary signal and interference detector 900 for the signal processing system of FIG. 8. The input signal on line 903 is provided to first and second cross-correlators 901, 902, the outputs of which are provided to a signal strength detector 904 and to an interference strength detector 906 respectively to provide signal 908 and interference 910 strength outputs for calculating a signal-to-interference strength ratio. Cross-correlator 901 cross-correlates the input signal with a known reference signal comprising a time-domain OFDM signal generated, for example, from a packet data frame preamble sequence. Cross-correlator 902 cross-correlates the input signal with a signal which is at least partially orthogonal to the known reference signal, and thus extracts an interference component from the input signal, as will be explained in more detail below. Where the reference signal is derived from a preamble data sequence the output of the signal and interference strength detector 900 will only be valid when the preamble sequence is present. In this case the cross-correlators 901, 902 may be arranged to operate over a time window during which the preamble sequence is present. The time window may be determined, for example, by a synchronisation process such as an FFT window control process (not shown in FIG. 8). Alternatively one or more pilot signals transmitting a known data sequence substantially continuously may be extracted from the received signal and used in the cross-correlation process.

Figure 9B:
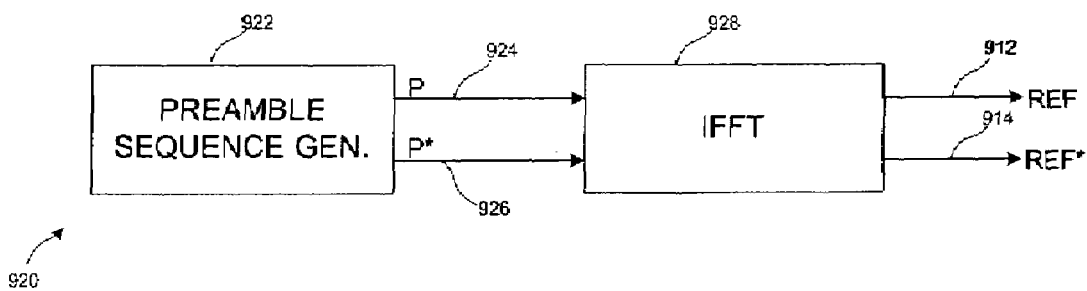

FIG. 9b shows an exemplary signal generator 920 for providing the reference and orthogonal reference signals 912, 914. The signal generator 920 comprises, in the illustrated example, a preamble sequence generator 922, to generate a preamble sequence 924 and a signal 926 orthogonal to the preamble sequence. These two signals are then inverse fast fourier transformed by IFFT 928 to provide reference signals 912 and 914. In a HIPERLAN 2 system the preamble sequence p may be generated using the polynomial $s(x)=x^7+x^4+1$ with an initial all ones state, replacing all "1"s with −1 and all "0"s with the number 1.

The operation of the signal and interference detector may be understood by considering a signal (R+I) where R is a known reference symbol and I is an interference contribution. The correlation of (R+I) with R is $R^2$, that is the result is a measure of the desired signal strength, assuming that the cross-correlation between the reference signal and the interference is low. The cross-correlation between (R+I) and R*, where R* is a signal orthogonal to R, is equal to the cross-correlation of R* with I as the cross-correlation of R* with R is by definition zero. The cross-correlation of R* with I is a measure of the interference strength. Thus the outputs from the signal and interference strength detector 900 can be used to calculate a form of signal-to-interference ratio, which can then be used by the beamsteering algorithm 832 to direct one or more antenna beams towards received signals with the least interference to the desired signal.

The correlation of two orthogonal sequences may be referred to as a zero-value-correlation, in mathematical terms, $$\sum_{i=1}^{N} a_i * b_i = 0; \quad \text{(Equation 1)}$$

where, $a_i$ is the first correlation sequence and $b_i$ is the second correlation sequence (both of length N). When the second correlation sequence is correlated with noise or co-channel or multipath interference the result is non-zero. The sequence $a_i$ is inserted into the data frame, for example, in the preamble. One way to format a zero-value-correlated sequence is from a pair of highly correlated sequences. A highly correlated sequence has the property:

$$R_{xx}(n) = \begin{cases} 1, n = 0 \\ 0, n = \pm 1, \pm 2, \pm 3, \pm 4, \ldots \end{cases} \quad \text{(Equation 2)}$$

By combining a pair of this kind, zero-value-correlation sequences can be defined. Total received signal energy can be found by calculating the received power, and one measure of the level of unwanted interference energy is indicated by the peak level of the zero-value-correlated signal.

The signal and interference detection operation may be carried out at the beginning of data reception and/or every successive packet, or frame-by-frame. The beamforming approach allows the formation of flexible beam patterns and, where signals from three or more elements are combined, multiple directional lobes. Suitable beamforming methods are described in more detail in J. E. Hudson, "Adaptive Array Principles", Peter Peregrinus Limited, 1981, which is hereby incorporated by reference.

Referring again to FIG. 8, the weights on line 834 from beamsteering algorithm 832 are provided to a frequency domain (i.e. post-FFT) weight calculation procedure 838. Also input to procedure 838 is channel information from a channel information calculation block 840. Channel information block 840 has inputs from FFT procedures 806a-d and provides an amplitude and phase value for each subcarrier. As the skilled person will be aware, a number of conventional channel estimation techniques exist for OFDM based upon, for example, the use of a preamble comprising one or more known OFDM training symbols and/or pilot subcarriers.

The weight for co-efficient calculation procedure 838 determines weights to be applied to each version of each subcarrier, in FIG. 8 by means of exemplary multipliers 816a-d and 820a-d. However there is no need to apply an iterative process such as algorithm 832 again as since the frequency domain weights are chosen to reproduce the same physical direction (or directions) as determined in the time domain a simple matrix multiplication will suffice. Thus with, for example, an array antenna with eight elements only eight multiplies are required.

The pre-FFT direction of arrival (DoA) calculation determines a set of weights on the assumption that the distance between each array antenna element is approximately half a wavelength. This assumption is correct at one frequency, typically the centre frequency, but to either side of this frequency the element spacing is no longer half a wavelength. Thus the weights may be adjusted by recalculation based upon an antenna array element spacing (in wavelengths) at the wavelength for which the set of weights is required. In one embodiment this calculation is performed by procedure 838. The skilled person will understand that the determination of a set of weights for each subcarrier does not need to make use of any one specific matrix equation.

Sets of weights for each subcarrier are extracted by demultiplexer 840 and provide (complex) inputs to, in FIG. 8, multipliers 816a-d and 820a-d. It will be appreciated that the functional elements of FIG. 8 may be implemented either in hardware or in software. Generally the downconverters 804 will be implemented in hardware, following which the received signals are digitised by analogue-to-digital converters (not shown), the remainder of the signal processing preferably taking place in the digital domain. Thus the functions of elements 806-840 will generally be implemented by software running on a digital signal processing integrated circuit, often a DSP tailored to radio applications.

The above-described method for extrapolating from pre-FFT weights to post-FFT weights assumes an approximately linear receiver response across the wideband OFDM signal. However in practice this assumption is not necessarily completely true as the frequency response of amplifiers and other signal processing elements in the receive chain is typically not completely flat. For example an amplifier may provide 10 dB of gain at 5 GHz but only 7 dB gain at 4.5 GHz and 5.5 GHz. It is therefore preferable to provide means for compensating for such gain and other variations in response across the wideband channel. This can be done by dividing the wideband OFDM channel into a plurality of sub-bands and determining, in the pre-FFT domain, a set of weights for each sub-band, based upon direction of arrival techniques as previously described. Each of these sets of weights can then be used to derive weights for use in the post-FFT domain, by allocating each subcarrier to one of the sub-bands. It will be appreciated that each of these sub-bands will generally comprise a plurality of subcarriers, for example 100 subcarriers, so that, in effect, the wideband OFDM signal is being sub-divided and the above-described technique applied within each sub-band. Thus, for example, the wideband OFDM signal may be sub-divided into between 4 and 10 sub-bands so that different sets of pre-FFT weights can be calculated for each of these sub-bands. In this way the burden of post-FFT weight calculation is still significantly reduced since each sub-band will typically contain many tens of subcarriers, without the rigid assumption of the applicability of a single set of weights across the wideband bandwidth. The sub-bands may be statically or dynamically allocated and may, for example, be based upon pilot frequencies within the OFDM signal.

Equation 3, below, shows the format of a weight vector $V_{weights}$ for one beam direction, direction i. A first beam direction is labelled by i=1; i=2 for a second beam direction and so on. The application of the above-described techniques where more than one direction of arrival is defined is discussed in more detail below with reference to FIGS. 10 and 11.

In equation 3 the superscript f denotes the frequency of one of the sub-bands, so that $f_1$ denotes the frequency of the first sub-band and $f_m$ denotes the frequency of the mth sub-band. The subscripts 1 to n label the antenna array elements. Thus, for example, XXX denotes the pre-FFT weight for the first antenna element at the centre frequency of the first sub-band, for the ith formed beam.

$$V_{weights} = \begin{bmatrix} w_{i,1}^{f_1} & w_{i,2}^{f_1} & \cdots & w_{i,n-1}^{f_1} & w_{i,n}^{f_1} \\ w_{i,1}^{f_2} & w_{i,2}^{f_2} & \cdots & w_{i,n-1}^{f_2} & w_{i,n}^{f_2} \\ \vdots & & \ddots & & \vdots \\ w_{i,1}^{f_{m-1}} & w_{i,2}^{f_{m-1}} & \cdots & w_{i,n-1}^{f_{m-1}} & w_{i,n}^{f_{m-1}} \\ w_{i,1}^{f_m} & w_{i,2}^{f_m} & \cdots & w_{i,n-1}^{f_m} & w_{i,n}^{f_m} \end{bmatrix} \quad \text{(Equation 3)}$$

Figure 10:
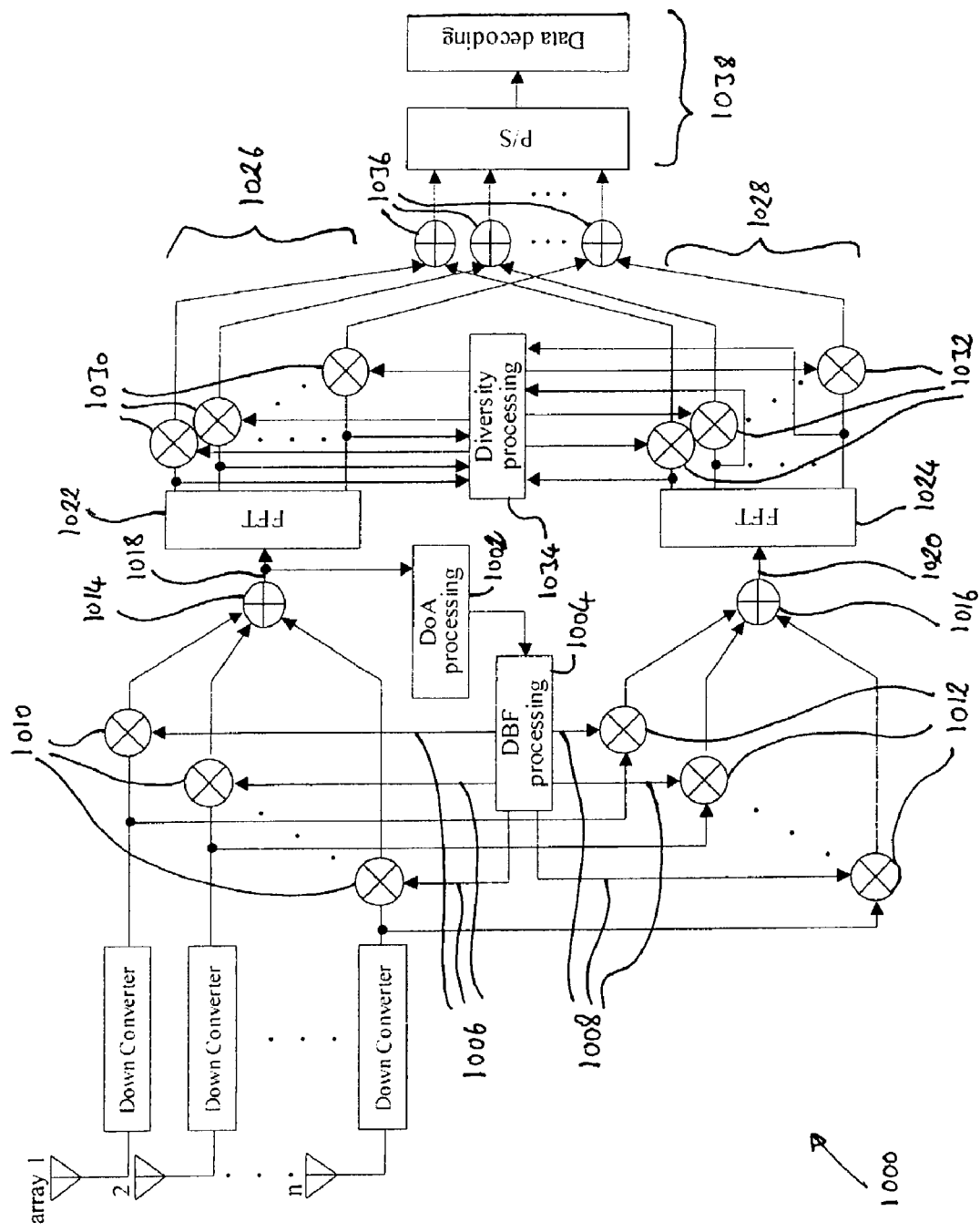
FIG. 10 shows an architecture of an OFDM receiver with pre-FFT digital beam-forming and post-FFT diversity.
Figure 11:
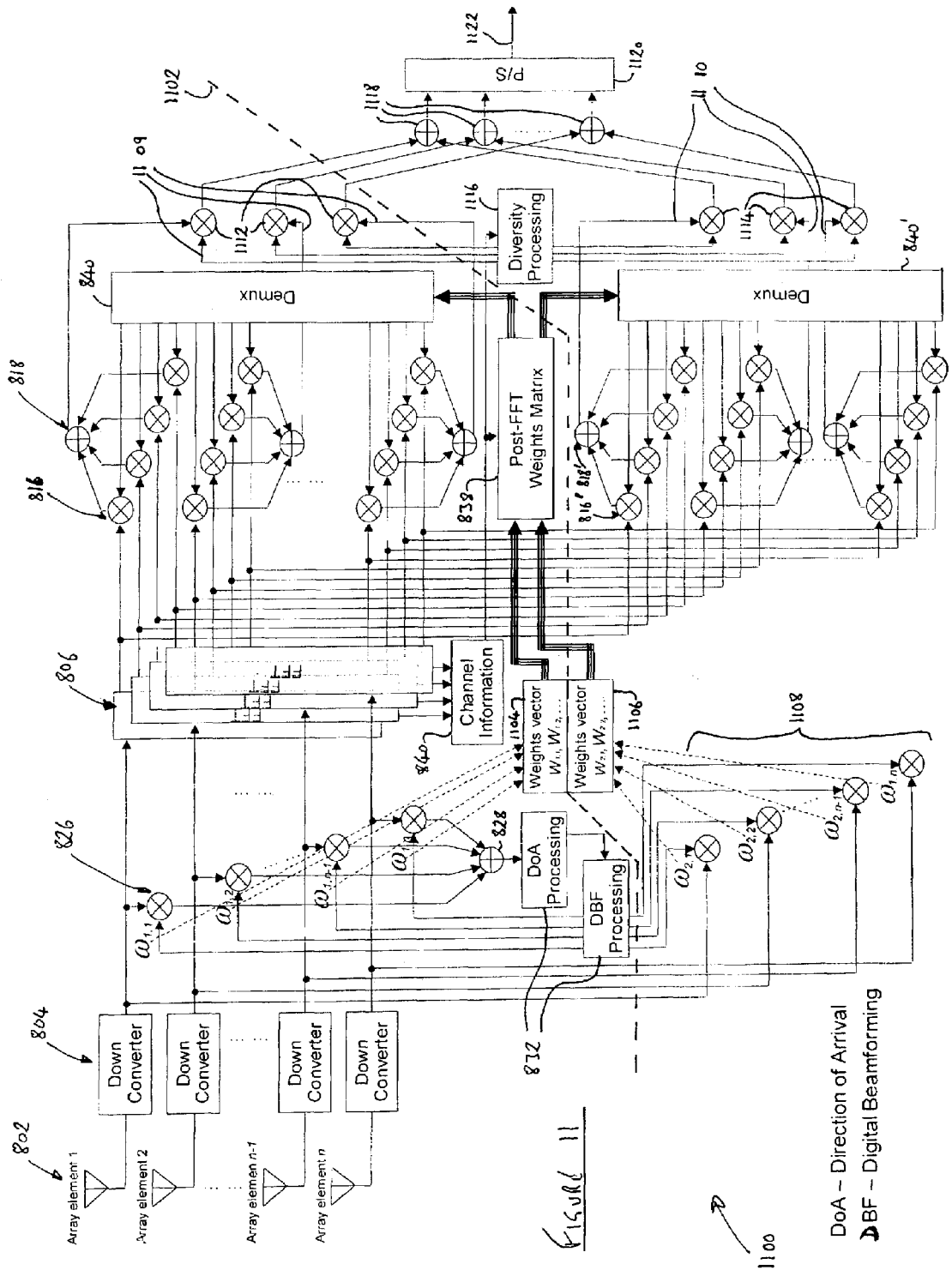
FIG. 11 shows an OFDM receiver for beam direction diversity reception according to an embodiment of the present invention.

Referring to FIG. 10, this shows the architecture of an OFDM receiver 1000 with pre-FFT digital beam forming (DBF) and post-FFT diversity, helpful for understanding the operation of the receiver of FIG. 11. The hybrid architecture of FIG. 10 includes time-domain DoA 1002 and DBF 1004 processing for forming two beams, each in a direction with a high signal-to-interference ratio. As in the arrangement of FIG. 8, an array antenna with n elements is employed so that up to n−1 directions may be defined although, in the arrangement of FIG. 10, only two directions are defined. The DoA process 1002 is based upon a Fourier method and operates in a corresponding manner to that for a narrow band system.

In the arrangement of FIG. 10 the DoA 1002 and DBF 1004 processing operates in the pre-FFT domain to generate two sets of weights 1006, 1008, each set multiplying 1010, 1012 signals from each of the antenna elements so that after summation 1014, 1016 of the signals two separate beam directions are defined. The signals 1018, 1020 from each of these beam directions are then FFT processed 1022, 1024 in a conventional manner to provide two pluralities of sub-carrier signals 1026, 1028, one set of subcarriers from each beam direction. The subcarriers are weighted 1030, 1032 according to an angular diversity process 1034 and then diversity combined by summing 1036 a version of each sub-carrier from each beam direction. The subcarriers are then processed 1038 in a conventional manner. It will be understood that the sub-carrier weightings 1030, 1032 will, in general, be complex, that is comprise both amplitude and phase values.

Referring now to FIG. 11, this shows a receiver architecture 1100 broadly similar to that of FIG. 8 but incorporating angular diversity along the lines illustrated in the receiver of FIG. 10. The portion of the receiver 1100 above dashed line 1102 broadly corresponds to the receiver 800 of FIG. 8. Thus like elements have been given like reference numerals and, in particular, the DoA and DFB processing blocks correspond to the beam steering process 832 of FIG. 8. However by contrast with FIG. 8, and similarly to FIG. 10, these processing blocks calculate two sets of weights vectors 1104, 1106, defining first and second beams. The weights vector 1104 is calculated in a corresponding manner to the FIG. 8 arrangement, to define a first beam but, in addition, a second weights vector 1106 is also determined to define a second beam direction of arrival. This is schematically illustrated by weights 1108, although a single input into DoA processing 832 is sufficient to determine more than one beam direction so that the conceptually illustrated signals from array antenna elements 802, as weighted by second weights vector 1106, are not needed by the DoA and DBF processing. As before, the beam directions are determined to maximise the signal-to-interference ratio and thus the two weights vectors 1104, 1106 preferably each define a beam direction with a high signal-to-interference ratio, for example the directions with the highest and next highest signal-to-interference ratio. It will be appreciated that although the arrangement of FIG. 11 only determines two different beam directions diversity reception may employ a plurality of such beam directions, up to n−1 directions, where n is the number of antenna elements.

As previously described the two weights vectors 1104 and 1106 are each used to generate a set of post-FFT weights, for each subcarrier within each beam direction processed. Thus below dashed line 1102 the receiver is provided with corresponding elements 816', 818', 840' to the receiver of FIG. 8 which, for conciseness, will not be described again. A set of subcarrier signals 1109, 1110 is thus obtained for each beam direction (for simplicity only three subcarrier signals are shown in FIG. 11). These are weighted using respective multipliers 1112, 1114 by applying (complex) weights determined by diversity processing unit 1116, which operates in a broadly similar manner to diversity processing unit 1034 of FIG. 10. Each weighted subcarrier from one beam direction is then combined with its counterpart from one or more other defined beam directions, in summers 1118, before further processing in a conventional manner, beginning with parallel to serial conversion 1120 to provide a data output 1122 for decoding. It will be appreciated that although, for simplicity, FIG. 11 shows the processing required for two beam directions, subcarriers from more than two beam directions may be combined for greater diversity gain.

The invention has been described with reference to a receiver but the skilled person will appreciate that once a set (or sets) of weights has been determined in the frequency domain, this same set (or sets) of weights may be applied when transmitting signals. In other words the weights may be employed to provide a spatial pattern for a transmit antenna which mitigates co-channel interference since, so far as concerns the radio channel, transmission and reception are symmetrical. This is particularly the case where transmission and reception are at the same frequency, for example in a time division duplex (TDD) system.

No doubt many effective alternatives will occur to the skilled person and the invention is not limited to the described embodiments but encompasses modifications within the spirit and scope of the attached claims.

We claim:

1. A signal processing system for determining weights for an adaptive antenna, the antenna having a plurality of antenna elements each for receiving a signal comprising a plurality of subcarriers, the system comprising:
   a plurality of inputs for receiving signals from said plurality of antenna elements;
   a time-to-frequency domain transformer for each input for transforming the signal from each input to a plurality of subcarrier signals;
   a first weight determiner coupled to said inputs, before the time-to-frequency domain transformer in the signal path, and configured to determine a first set of weights, one for each input; and
   a second weight determiner coupled to said first weight determiner and configured to determine, from the determination of said first set of weights, at least one second set of weights comprising a frequency-domain weight for a subcarrier signal derived from each of said inputs.

2. A signal processing system as claimed in claim 1 wherein said second weight determiner is configured to determine a plurality of second sets of weights, one second set of weights for each subcarrier signal.

3. A signal processing system as claimed in claim 1 further comprising a channel estimator for each said input to provide at least one channel estimate for the signal from each input to the second weight determiner.

4. A signal processing system as claimed in claim 1 further comprising a combiner to combine, for each of said subcarrier signals, a set of weighted versions of the subcarrier signal derived by applying one of said second sets of weights to a set of versions of said subcarrier signal, one from each of said inputs.

5. A signal processing system as claimed in claim 1 wherein said first set of weights defines at least one antenna beam direction and wherein each second set of weights defines substantially the same antenna beam direction for one of said subcarriers.

6. A signal processing system as claimed in claim 5 wherein said first set of weights defines a plurality of antenna beam directions and wherein each second set of weights defines substantially the same plurality of beam directions for one of said subcarriers.

7. A signal processing system as claimed in claim 1 wherein said first weight determiner implements an algorithm to determine a directional response of said antenna.

8. A signal processing system as claimed in claim 7 further comprising a signal and interference detector for determining a signal-to-interference ratio for each of said received signal inputs, and wherein said algorithm determines said directional response using said signal-to-interference ratios.

9. A signal processing system as claimed in claim 8 wherein said signal and interference detector comprises at least one cross-correlator to determine a correlation between a said received signal and a first reference signal and between the received signal and a second reference signal at least partially orthogonal to the first reference signal, to provide said signal and interference output.

10. A signal processing system as claimed in claim 9 wherein said first and second reference signals each comprise a set of substantially orthogonal carriers.

11. A signal processing system as claimed in claim 9 further comprising a reference signal generator to generate said first and second reference signals for said signal and interference detector.

12. A signal processing system as claimed in claim 1 further comprising a third weight determiner coupled to said time-to-frequency domain transformer to receive one or a group of said subcarrier signals transformed from each of said received signal inputs and configured to determine a third set of weights for said one or said group of subcarrier signals.

13. A signal processing system as claimed in claim 1 wherein said first weight determiner is configured to determine a plurality of said first sets of weights, one for each of a plurality of sub-bands of said signal comprising a plurality of subcarriers.

14. A signal processing system as claimed in claim 13 wherein said second weight determiner is configured to determine a plurality of second sets of weights, one for each subcarrier, using said plurality of first sets of weights.

15. A signal processing system as claimed in claim 14 wherein each said subcarrier is allocated to one of said sub-bands, and wherein said second weight determiner is configured to determine a said second set of weights using the first set of weights for the sub-band to which the subcarrier is allocated.

16. A signal processing system as claimed in claim 1 wherein said first weight determiner is configured to determine a plurality of said first sets of weights defining a corresponding plurality of antenna beam directions.

17. A signal processing system as claimed in claim 16 wherein said second weight determiner is configured to determiner a plurality of said second sets of weights, one for each said beam direction.

18. A signal processing system as claimed in claim 17 further comprising a diversity processor and a combiner coupled to said diversity processor to combine versions of a said subcarrier signal weighted by a weight from each of said plurality of second sets of weights.

19. A signal processing system as claimed in claim 1 wherein a said received signal comprises an OFDM signal and wherein said transformer is configured to fourier transform the received signal.

20. A signal processing system as claimed in claim 1 wherein said first weight determiner is replaced by an antenna signal processor configured to determine a direction of arrival of a signal received at the antenna, and wherein said second weight determiner is configured to determine the second set of weights using said direction of arrival.

21. A method of determining weights for an adaptive antenna, the antenna having a plurality of antenna elements each for receiving a signal comprising a plurality of subcarriers, the method comprising:
  receiving a plurality of signals from said plurality of antenna elements;
  transforming each of said plurality of received signals into a plurality of subcarrier signals;
  determining a first set of weights, one for each received signal; and determining, using the determination of said first set of weights, at least one second set of weights comprising a frequency-domain weight for a subcarrier signal derived from each of said received signal inputs signals.

22. A method as claimed in claim 21 comprising determining a plurality of second sets of weights, one second set of weights for each subcarrier signal.

23. A method as claimed in claim 21 further comprising:
  estimating a channel response for each of said received signals; and
  using said channel responses to determine said second sets of weights.

24. A method as claimed in claim 21 further comprising:
  combining, for each of said subcarrier signals, a set of weighted versions of a said subcarrier signal derived by applying one of said second sets of weights to a set of versions of said subcarrier signal, one from each of said received signals.

25. A method as claimed in claim 21 wherein said first set of weights defines at least one antenna beam direction and wherein each second set of weights defines substantially the same antenna beam direction for one of said subcarriers.

26. A method as claimed in claim 21 wherein said first set of weights defines a plurality of antenna beam directions and wherein each second set of weights defines substantially the same plurality of beam directions for one of said subcarriers.

27. A method as claimed in claim 21 wherein said determining of a first set of weights includes implementing an algorithm to determine a directional response of said antenna.

28. A method as claimed in claim 27 further comprising:
  determining a signal-to-interference ratio for each of said received signals; and
wherein said algorithm determines said directional response using said signal-to-interference ratios.

29. A method as claimed in claim 28 wherein each said signal-to-interference ratio is determined by correlating a portion of a signal received by an antenna element with a first reference signal and with a second reference signal at least partially orthogonal to the first.

30. A method as claimed in claim 29 wherein said first reference signal comprises a set of substantially orthogonal carriers.

31. A method as claimed in claim 30 wherein the carriers of said first reference signal are modulated by a known data sequence.

32. A method as claimed in claim 21 further comprising:
  determining a third set of weights for one or a group of said subcarrier signals.

33. A method as claimed in claim 21 comprising determining a plurality of said first sets of weights, one for each of a plurality of sub-bands of said signal comprising a plurality of sub carriers.

34. A method as claimed in claim 33 comprising determining a plurality of second sets of weights, one for each subcarrier, using said plurality of first sets of weights.

35. A method as claimed in claim 34, wherein each said subcarrier is allocated to one of said sub-bands, and further comprising determining said second set of weights using the first set of weights for the sub-band to which the subcarrier is allocated.

36. A method as claimed in claim 21 comprising determining a plurality of said first sets of weights defining a corresponding plurality of antenna beam directions.

37. A method as claimed in claim 36 comprising determining a plurality of said second sets of weights, one for each said beam direction.

38. A method as claimed in claim 37 further comprising combining versions of a said subcarrier signal weighted by a weight from each of said plurality of second sets of weights.

39. A method as claimed in claim 21 wherein a said received signal comprises an OFDM signal and wherein said transforming implements a fourier transform.

40. A method of adaptive beamforming for an OFDM antenna comprising a plurality of antenna elements, the method comprising:
    applying a first beamforming algorithm in the time domain to determine at least one antenna beam direction; and
    calculating a set of weights for application in the frequency domain to versions of at least one subcarrier, each version of the subcarrier being received by a corresponding one of the antenna elements;
    said set of weights being calculated using said at least one antenna beam direction.

41. A method of calculating weights for an array antenna for receiving an orthogonal frequency division multiplexed (OFDM) signal comprising a plurality of subcarriers, the method comprising:
    determining, in a time domain, a direction of arrival of the OFDM signal at the array antenna; and
    calculating at least one set of weights for application to the subcarriers of the OFDM signal in a frequency domain using said direction of arrival.

42. A method as claimed in claim 41 further comprising:
    calculating a plurality of said sets of weights, one for each subcarrier, using said direction of arrival.

43. A processing system for an adaptive antenna, the processing system configured to calculate weights for an array antenna for receiving an orthogonal frequency division multiplexed (OFDM) signal comprising a plurality of subcarriers, the system adapted for:
    determining, in a time domain, a direction of arrival of the OFDM signal at the array antenna; and
    calculating at least one set of weights for application to the subcarriers of the OFDM signal in a frequency domain using said direction of arrival.

44. A processing system for an adaptive antenna, the processing system configured to calculate weights for an array antenna for receiving an orthogonal frequency division multiplexed (OFDM) signal comprising a plurality of subcarriers, the system adapted for:
    determining, in a time domain, a direction of arrival of the OFDM signal at the array antenna; and
    calculating a plurality of said sets of weights, one for each subcarrier of the OFDM signal in the frequency domain, using said direction of arrival.

* * * * *